United States Patent [19]

Baird

[11] Patent Number: 5,431,942
[45] Date of Patent: Jul. 11, 1995

[54] METHOD AND APPARATUS FOR SHAPING FOOD PRODUCTS

[75] Inventor: Kenneth J. Baird, Hillsborough Co., Ireland

[73] Assignee: Moy Park Limited of the Food Park, Armagh, Ireland

[21] Appl. No.: 66,482

[22] Filed: May 24, 1993

[51] Int. Cl.$^6$ ............... A22C 7/00; A23P 1/00
[52] U.S. Cl. ...................... 426/512; 425/417; 425/440; 426/513
[58] Field of Search ............... 426/512, 513; 425/348 R, 440, 417; 99/450.8

[56] References Cited

U.S. PATENT DOCUMENTS

| | | | |
|---|---|---|---|
| 2,757,093 | 7/1956 | Starzyk | 426/414 |
| 3,332,106 | 7/1967 | Zoehfeld | 425/318 |
| 3,820,449 | 6/1974 | Oickle | 99/485 |
| 3,913,175 | 10/1975 | Peterson | 426/513 |
| 4,057,874 | 11/1977 | Walker, Jr. | 99/450.8 |
| 4,276,318 | 6/1981 | Orlowski et al. | 425/348 R |
| 4,460,611 | 7/1984 | Suzuki | 426/512 |
| 4,500,276 | 2/1985 | Cherkasky et al. | 425/417 |

FOREIGN PATENT DOCUMENTS

| | | |
|---|---|---|
| 1293169 | 10/1972 | European Pat. Off. . |
| 1352813 | 5/1974 | European Pat. Off. . |
| 0233042 | 8/1987 | European Pat. Off. . |
| 2506433 | 8/1976 | Germany . |
| 2059242 | 4/1981 | United Kingdom . |
| 2070501 | 9/1981 | United Kingdom . |
| 2173443 | 10/1986 | United Kingdom . |
| 2261625 | 5/1993 | United Kingdom . |

*Primary Examiner*—George Yeung
*Attorney, Agent, or Firm*—Brooks & Kushman

[57] ABSTRACT

The invention proposes a method of sealing and/or shaping a food product and apparatus for use in performing the method. Food product is placed on a support surface (10), and a molding surface—comprising a flexible diaphragm (25) is lowered over the food product. Air pressure acting on the diaphragm applies a force to the food product for the purpose of sealing and/or shaping the food product. The arrangement produces a more random appearance to the resulting food product. A plurality of food products are acted on by a respective molding surface which are carried from a common framework. The support surface is preferably a conveyor belt and the framework is mounted for reciprocal movement so that molding pressure can be applied to the food product during an indexing movement of the support surface.

16 Claims, 2 Drawing Sheets

METHOD AND APPARATUS FOR SHAPING FOOD PRODUCTS

BACKGROUND OF THE INVENTION

1. Field of the Invention

The present invention relates to a method of and apparatus for sealing and/or shaping a food product.

2. Related Art Statement

There is an increasing trend to give basic foods, be they meat, poultry or fish, added value by adding ingredients and/or presenting it in a certain shape or format. There is also an increasing trend to introduce automation into the production of such food products since it is perceived as reducing possible contamination by virtue of reducing the handling by humans. One area where automation has been introduced is in the sealing and shaping of food products in which a mold is employed usually comprising two halves in which the food product is introduced and pressed into shape conforming to the internal shape of the mold. However, this has the disadvantage that each product has substantially the same shape and this is perceived as a negative feature. Accordingly, it is an aim of the present invention to have an advantage of automation whilst avoiding the perceived disadvantages.

SUMMARY OF THE INVENTION

Accordingly, a first aspect of the invention provides a method of sealing and/or shaping a food product comprising placing a food product to be further processed on a support surface, placing over the food product a sealing and/or shaping unit comprising a molding surface by which pressure is applied to the food product to seal and/or shape same, and subsequent releasing the resulting product.

Another aspect comprises apparatus sealing and/or shaping a food product comprising a support surface, a sealing and/or shaping unit comprising a molding surface adapted to be moved towards and away from a food product placed on the support surface for the purposes of sealing and/or shaping same.

Conveniently the positioning of the food product on the support surface is done manually and this can give rise to slight differences in the relative positioning between the food product and the processing station which, in turn, gives rise to a random shaping effect. It is preferred for the molding surface to comprise a flexible diaphragm to which pressure is applied to urge it into contact with the food product. It is further preferred that the flexible diaphragm have a preformed starting shape. Pressure on the diaphragm will produce a largely uniform pressure on the food product and as a consequence the resulting shape will also be influenced by the original shape of the flexible diaphragm and by the composition of the food product, e.g. relative density of the product, some parts of which may well resist deformation more than others. Thus the use of the flexible diaphragm gives rise to a more randomly shaped product.

Preferably the molding surface extends to a continuous periphery which is disposed beyond the extent of the food product so that it will not impose its peripheral shape on the food product. Preferably the periphery makes contact with the support surface in a sealing manner.

A preferred sealing and/or shaping unit comprises a rigid cup-like member with the flexible diaphragm, usually food quality latex rubber-like material, fitted across its open end and extending over the rim of the cup-like member. A port is provided for introducing air into the cup underneath the diaphragm. It is preferred for the food support surface to comprise a conveyor belt having markings to denote the location for positioning a food product for acting on by the sealing and/or shaping unit. In fact, several sealing and/or shaping units will be provided on a framework for acting on a respective food product placed on the conveyor surface. We have found it particularly convenient to mount the framework for reciprocal movement in the direction of movement of the conveyor belt and to arrange for the conveyor belt to move on an indexed basis whereby a group of food products can be positioned for acting on by the respective sealing and/or shaping units at a station disposed downstream of a food product positioning station. It is further preferred for the sealing and/or shaping units to be mounted for raising and lowering by way of air cylinders which, in use, act to lower the units over the food product disposed at said discrete locations whereafter air pressure is introduced into the units to cause the diaphragms to contact the food product and act to seal and/or shape the food product. This is conveniently done as the framework is indexed longitudinally along with movement of the conveyor whereupon air pressure is released and the units are raised and the framework cycled back to its start position for repeating the cycle.

Preferably means are provided for moving the conveyor intermittently, which means may be used to move the framework with a further means providing a return movement to the framework to cycle back to its start position. Alternatively means such as rams could be used to move the framework in synchronism with the conveyor as well as providing the return movement.

In one embodiment in the shaping and sealing phase of the cycle, the framework is carried along at the same speed as the product carrying conveyor by means of an engaged chain which is driven by the same motor as the conveyor. At the end of this phase the drive chain is disengaged and rams return the framework to the start position of the cycle.

BRIEF DESCRIPTION OF THE DRAWINGS

The present invention will now be described further by way of example only with reference to the accompanying drawings, in which.

BEST MODES FOR CARRYING OUT THE INVENTION

Figure 1:
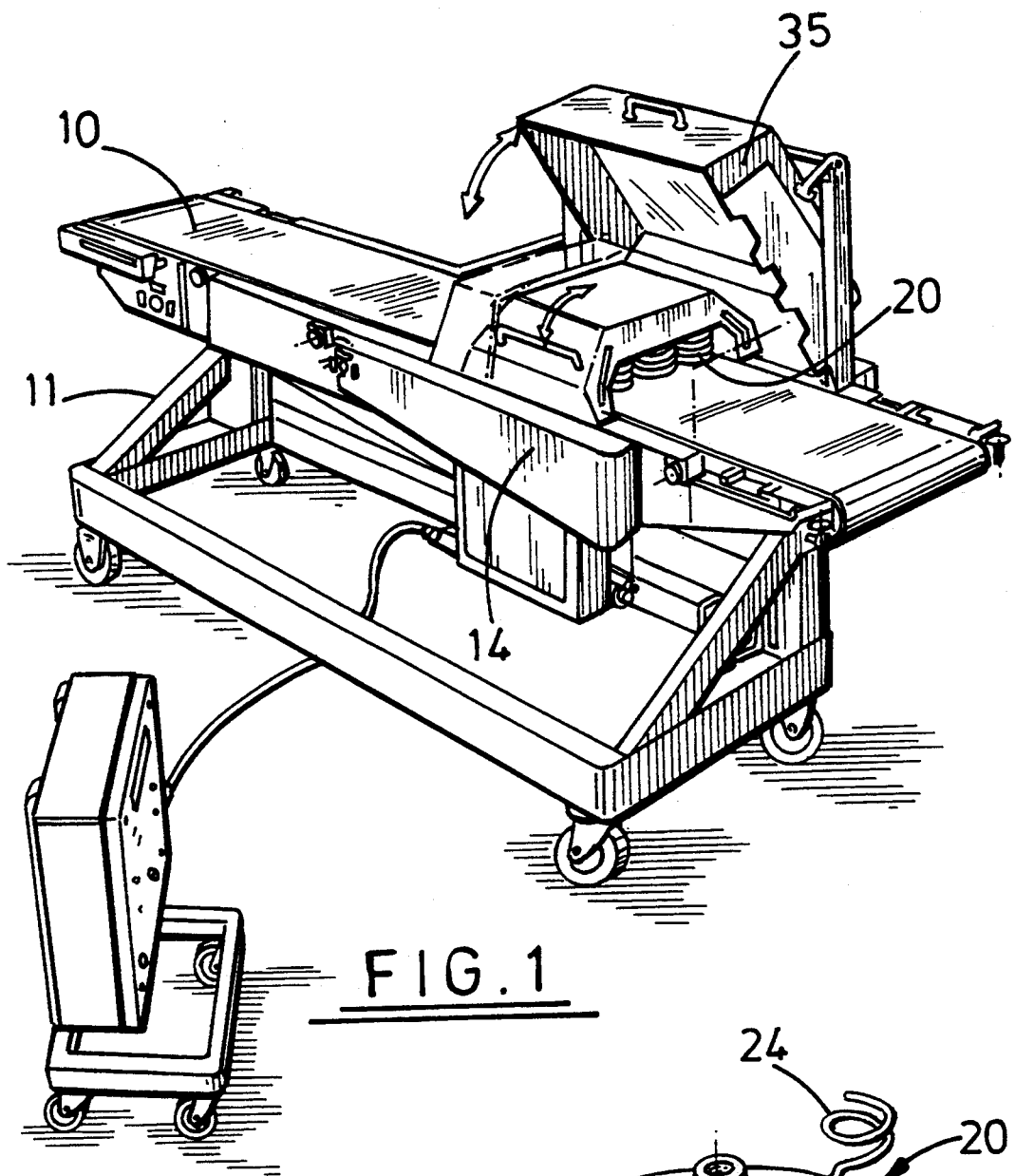
FIG. 1 is a perspective view of food processing apparatus according to the invention.
Figure 3:
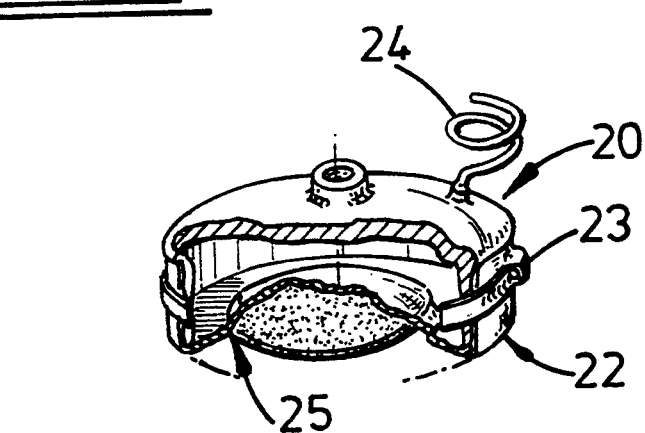
FIG. 3 is a broken away perspective view of a sealing and/or shaping unit employed in the invention.
Figure 2:
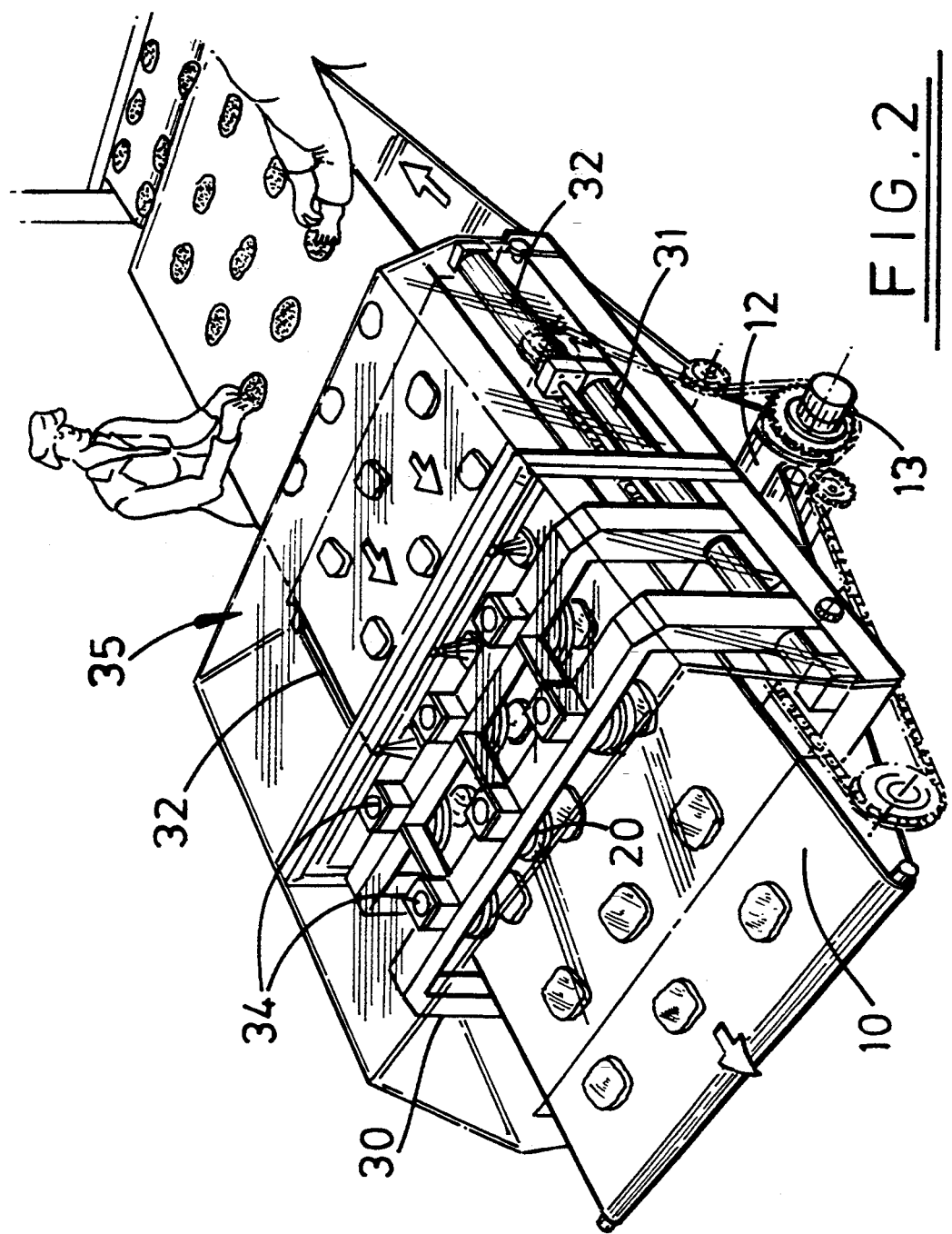
FIG. 2 is a more detailed perspective view showing the conveyor and food processing units and indexing mechanism.

Referring to the drawings a food processing apparatus comprises a conveyor belt 10 supported on a portable trolley 11, with food processing units 20 held in a supporting carriage 30. The conveyor 10 is moved by a motor driven conveyor roller 12, which roller is provided with a clutch mechanism 13 connected to drive the carriage 30 in the direction of movement of the conveyor belt 10. Pneumatic rams 32 are provided to allow a return movement of the carriage 20 supported on guide bars 31. The carriage 30 moves within a stationary guard 35. The guard 35 is conveniently transparent and hinged so as to be removable for ease of cleaning. Side guards 14 cover the roller 12 and clutch mechanism 13 in use.

The carriage 30 supports six food processing units 20 known as pressure pots, each of which is carried by a respective air cylinder assembly 34 mounted on the carriage 30. The cylinders serve to raise and lower the pressure pots as described further hereinafter had pressure pot 20 comprises a rigid cup 21 with an open end covered by a rubber diaphragm 22 held in place by a jubilee clip 23. Tubing 24 enters the cup 21 to supply air from an air source (not shown). A control system with appropriate valves is provided to control inlet and exhausting of air to the air cylinders 34 and the pressure pots 20. In use the pressure pot 20 overlies a food product and when the cylinder 34 is pressurised it lowers the pressure pot over the food product with the periphery of the diaphragm 22 forming a seal with the conveyor surface. Air is introduced into the pressure pot enclosing the food product as shown at 25 and whilst the pot 20 is pressurised the diaphragm 22 exerts pressure on the food product so shaping it randomly.

According to one embodiment a group of food products is manually positioned on the conveyor 10 upstream of the pressure pots 20. The conveyor 10 is moved intermittently via the roller 12 so as to position the group of food products for acting upon by the pressure pots 20. The pots 20 are lowered by way of the air cylinders 34 and then pressurised with air to shape the food products as described above. The food product is shaped whilst the carriage 30 is moving in synchronism with the conveyor 12. When the air pressure in the pots 20 is released the pots are raised by way of air cylinders 34 and the carriage returned to its original position by action of rams 32 and suitable control means. The indexed movement of the conveyor 12 during the shaping of the food product brings a new group of food products into position for shaping by application thereto of the returned pressure pots 20.

I claim:

1. A method of shaping a food product comprising placing a food product to be further processed on a support surface which is substantially planar, placing over the food product a shaping unit comprising a molding surface by which pressure is applied to the food product to shape same, wherein the molding surface comprises a flexible diaphragm to which pressure is applied to urge it into contact with the food product, and in which the molding surface extends to a continuous periphery that is brought into sealing contact with the support surface and is disposed beyond the extent of the food product both before commencement of molding and at the conclusion of molding, such that the continuous periphery of the molding surface does not dictate the complete shape of the food product, and subsequently releasing the resulting product.

2. A method as claimed in claim 1 in which positioning of the food product on the support surface is done manually.

3. A method as claimed in claim 1 in which the flexible diaphragm has a preformed starting shape.

4. A method as claimed in claim 1 comprising moving the support surface from a food product positioning station, lowering the shaping unit over the food product, moving the shaping unit and support surface in synchronism whilst applying pressure to the food product, raising the shaping unit and moving it upstream to its starting position and repeating the steps for subsequent food product.

5. A method as claimed in claim 1 in which a plurality of food products are placed on the support surface to be acted on by a respective shaping unit.

6. Apparatus for shaping a food product comprising a support surface which is substantial planar, a shaping unit comprising a molding surface adapted to be moved towards and away from a food product placed on the support surface for the purposes of shaping same and wherein the molding surface comprises a flexible diaphragm to which pressure is applied to urge it into contact with the food product, and in which the flexible diaphragm extends to a continuous periphery that is brought into sealing contact with the support surface and is disposed beyond the extent of the food product both before commencement of molding, and at the conclusion of molding such that the continuous periphery of the molding surface does not dictate and is not intended to dictate the complete shape of the food product.

7. Apparatus as claimed in claim 6 in which the flexible diaphragm has a preformed starting shape.

8. Apparatus as claimed in claim 6 in which the periphery makes sealing contact with the support surface.

9. Apparatus as claimed in claim 6 in which the shaping unit comprises a rigid caplike member and the molding surface comprises a flexible diaphragm which extends across the open end of the cup-like member and over its rim.

10. Apparatus as claimed in claim 9 further comprising a port for introducing air into the cup-like member to act on the diaphragm.

11. Apparatus as claimed in claim 6 in which the support surface comprises a conveyor belt.

12. Apparatus as claimed in claim 11 in which the conveyor belt has markings to denote the location for positioning a food product on the conveyor belt.

13. Apparatus as claimed in claim 6 in which a plurality of said shaping units are carried by a framework for acting on a respective food product.

14. Apparatus as claimed in claim 6 in which the shaping unit is mounted for reciprocal movement relative to the support surface.

15. Apparatus as claimed in claim 12 in which a drive motor is provided to drive the support surface in a downstream direction and means is provided to entrain the shaping unit for movement therewith in the downstream direction, and further comprising means for moving said unit in the upstream direction.

16. Apparatus as claimed in claim 6 further comprising means for raising and lowering said unit.

* * * * *